US 8,060,101 B2

(12) United States Patent
Long et al.

(10) Patent No.: US 8,060,101 B2
(45) Date of Patent: Nov. 15, 2011

(54) MOBILE VIRTUAL NETWORK OPERATOR (MVNO) PROVISIONING AND VOICEMAIL ROUTING BY A MOBILE VIRTUAL NETWORK ENABLER (MVNE)

(75) Inventors: Bill Long, Louisville, CO (US); Wayne Simpkins, Crestwood, KY (US)

(73) Assignee: Level 3 Communications, LLC, Broomfield, CO (US)

( * ) Notice: Subject to any disclaimer, the term of this patent is extended or adjusted under 35 U.S.C. 154(b) by 1010 days.

(21) Appl. No.: 11/761,125

(22) Filed: Jun. 11, 2007

(65) Prior Publication Data

US 2008/0305803 A1    Dec. 11, 2008

(51) Int. Cl.
H04W 40/00    (2009.01)

(52) U.S. Cl. ............... 455/445; 455/433; 455/432.1; 379/88.23; 379/88.24; 379/88.25

(58) Field of Classification Search ........... 379/88.22, 379/88.23, 88.24, 88.25, 88.26, 88.27, 88.28; 455/445, 433, 432.1

See application file for complete search history.

(56) References Cited

U.S. PATENT DOCUMENTS

| | | | | |
|---|---|---|---|---|
| 2006/0077956 | A1* | 4/2006 | Saksena et al. | 370/352 |
| 2007/0070976 | A1* | 3/2007 | Mussman et al. | 370/351 |
| 2007/0206735 | A1* | 9/2007 | Silver et al. | 379/88.19 |
| 2008/0311907 | A1* | 12/2008 | Watson et al. | 455/435.1 |

FOREIGN PATENT DOCUMENTS

| EP | 1739992 A1 | 1/2007 |
|---|---|---|
| KR | 102006-0116395 A | 11/2006 |

OTHER PUBLICATIONS

International Searching Authority, Korean Intellectual Property Office, International Search Report (Form PCT/ISA/210) for international application No. PCT US 2008/066421, International Filing Date Jun. 10, 2008, 6 pages.
International Searching Authority, Korean Intellectual Property Office, Written Opinion of the International Searching Aughtority (Form PCT/ISA/237) for international application No. PCT/US 2008/066421, international Filing Date: Jun. 10, 2008, 4 pages.

* cited by examiner

Primary Examiner — Wayne Cai
Assistant Examiner — Julio Perez (57) ABSTRACT

According to various embodiments of the present invention, systems and methods for mobile virtual network operator (MVNO) telephone number provisioning and voicemail routing by a mobile virtual network enabler (MVNE) are disclosed. In one embodiment, a method includes: provisioning a telephone number (TN) and its associated mobile subscriber identification (MSID) owned by a mobile virtual network operator (MVNO) on a home location register (HLR) of a third party carrier, the third party carrier is not the owner of the TN; routing a call to the provisioned TN from a calling party by utilizing the HLR, wherein a called party of the TN is at least one of providing no answer or unreachable; receiving an indication from a gateway mobile switching center (GW MSC) of the third party carrier that there is no voicemail transfer number associated with the TN; and initiating a new call to a voicemail server of the MVNO, the new call to provide voicemail associated with the TN to the calling party. Other embodiments are also disclosed.

20 Claims, 7 Drawing Sheets

Fig. 6

MOBILE VIRTUAL NETWORK OPERATOR (MVNO) PROVISIONING AND VOICEMAIL ROUTING BY A MOBILE VIRTUAL NETWORK ENABLER (MVNE)

BACKGROUND OF THE INVENTION

In the present telecommunications industry, wireless companies are emerging which do not own a licensed frequency spectrum and typically do not own their own network infrastructure. However, these wireless companies resell wireless services under their own brand name by utilizing the network of another wireless operator. Typically, these Mobile Virtual Network Operators (MVNOs) have business arrangements with traditional mobile operators to buy minutes of use (MOUs) for sale to their customers.

In order for MVNOs to successfully operate, a Mobile Virtual Network Enabler (MVNE) may assist an MVNO by providing the infrastructure and services to enable MVNOs to offer services and have a relationship with end-user customers. The MVNE does not have a relationship with the end-user customer. MVNEs offer infrastructure and related services ranging from network element provisioning, administration, and operations to OSS/BSS support.

MVNEs often provide the middle ground between MVNOs that do not want to have any control over network elements and those that want complete control. Some MVNOs may want to completely rely on the underlying wireless network infrastructure of the host mobile network operator whereas other MVNOs may want to own and/or control their own network elements. MVNEs provide the middle ground in the sense that then can provide options to MVNOs for what they bring in-house versus what they rely on the host carrier for.

Two particular problematic areas for MVNOs are telephone number provisioning and voicemail services. Most MVNOs do not own a home location register (HLR) on which to provision telephone numbers for location tracking, and thereby call routing. In addition, many MVNOs would like to offer a voicemail option specific to the MVNO, rather than having to rely on the voicemail services of a third party wireless carrier. An MVNE that could provide advanced features relating to these areas would be beneficial.

BRIEF SUMMARY OF THE INVENTION

According to various embodiments of the present invention, systems and methods for mobile virtual network operator (MVNO) telephone number provisioning and voicemail routing by a mobile virtual network enabler (MVNE) are disclosed. In one embodiment, a method includes provisioning a telephone number (TN) and its associated mobile subscriber identification (MSID) owned by a mobile virtual network operator (MVNO) on a home location register (HLR) of a third party carrier, wherein the third party carrier is not the owner of the TN; routing a call to the provisioned TN from a calling party by utilizing the HLR, wherein a called party of the TN is at least one of providing no answer or unreachable; receiving an indication from a gateway mobile switching center (GW MSC) of the third party carrier that there is no voicemail transfer number associated with the TN; and initiating a new call to a voicemail server of the MVNO, the new call to provide voicemail associated with the TN to the calling party. Other embodiments are also disclosed.

In another embodiment, an apparatus is disclosed. In one embodiment, the apparatus includes a feature server operated by a mobile virtual network operator (MVNO) to: receive a call from a calling party to a telephone number (TN) owned by the MVNO, wherein the TN is provisioned with its associated mobile subscriber identification (MSID) on a home location register (HLR) of a third party carrier, where the third party carrier is not the owner of the TN; and receiving an indication from a gateway mobile switching center (GW MSC) of the third party carrier that the called party of the TN is at least one of providing no answer or unreachable and that there is no voicemail transfer number associated with the TN. The apparatus further includes a voicemail server operated by the MVNO to receive a new call initiated by the feature server and to provide voicemail associated with the TN to the calling party. Other embodiments are also disclosed.

In yet another embodiment, a system is disclosed. In one embodiment the system includes a home location register (HLR) of a wireless carrier provisioned with a telephone number (TN) and its associated mobile subscriber identification (MSID) owned by a mobile virtual network operator (MVNO), where the wireless carrier is not the owner of the TN. The system further includes a gateway mobile switching center (GW MSC) operated by the wireless carrier to: route a call to the provisioned TN from a calling party by utilizing the HLR, wherein the called party of the TN is at least one of providing no answer or unreachable; and provide an indication to the MVNO that there is no voicemail transfer number in the HLR associated with the TN in order for the MVNO to initiate a new call to a voicemail server of the MVNO, the new call to provide voicemail associated with the TN to the calling party. Other embodiments are also disclosed.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

One or more embodiments of the present invention are related to wireless telecommunications and, more particularly, to systems and methods for mobile virtual network operator (MVNO) telephone number provisioning and voicemail routing by a mobile virtual network enabler (MVNE).

Figure 6:
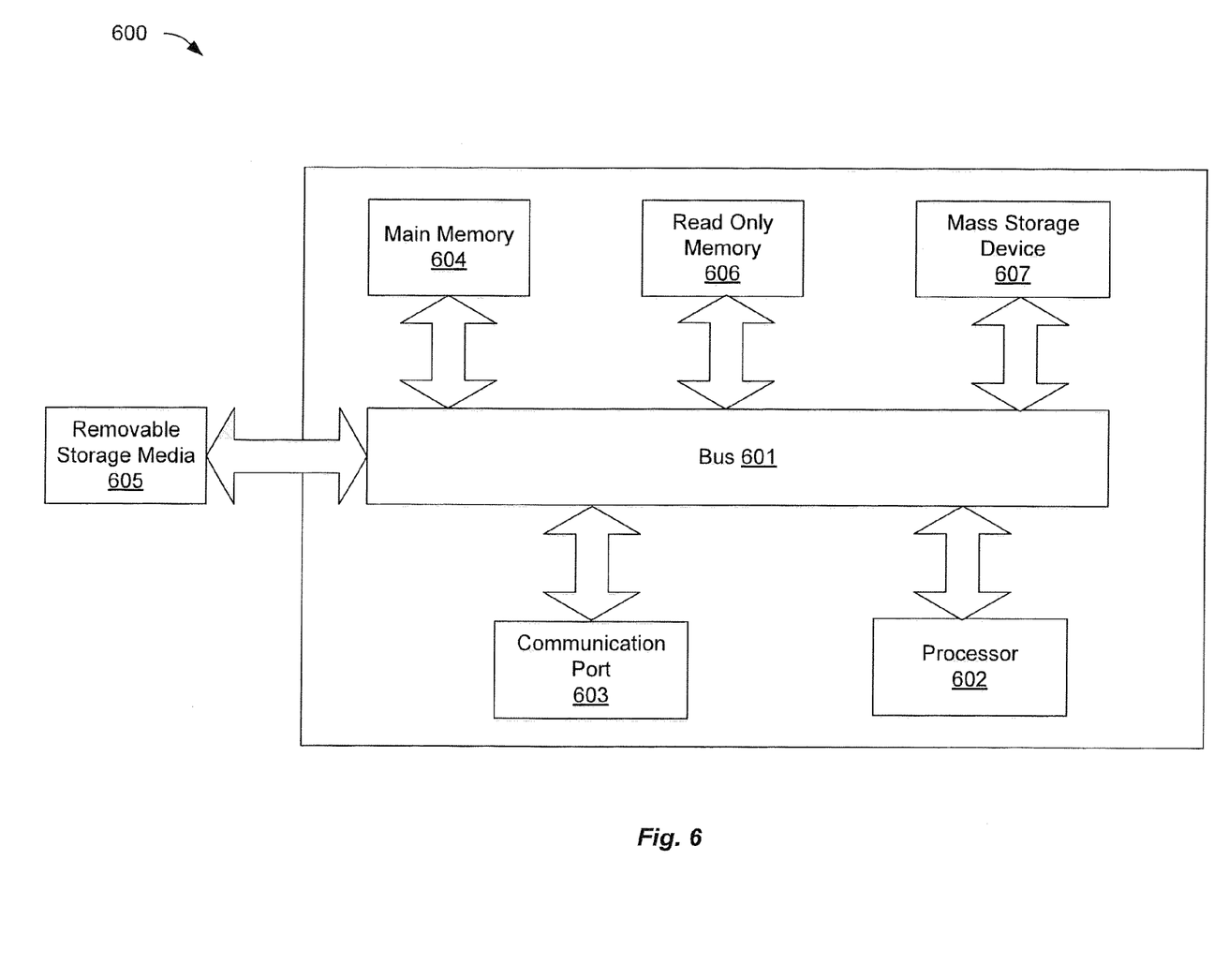
FIG. 6 is an example of a computer system with which embodiments of the present invention may be utilized.

Some embodiments of the present invention provide systems and methods for MVNO telephone number provisioning and voicemail routing by a MVNE. The systems and methods can be implemented using computers and computer software, such as depicted in FIG. 6, for example. Such computer software can be maintained on a computer readable medium. As used herein, the term "computer readable medium" is used in its broadest sense to mean any storage device accessible to a computer. Thus, for example, a computer readable medium can be a hard disk drive, a RAM, a floppy diskette, a CD ROM, an EEPROM, a magnetic tape, and/or the like. In some cases, the computers and/or computer software can communicate via a network. In particular, the computers can be communicably coupled to a network and/or each other. As used herein, the term "network" is used in its broadest sense to mean any system capable of passing communications from one entity to another. Thus, for example, a network can be, but is not limited to, the Internet, a virtual private network, a local area network, a wide area network, a WiFi network, a PSTN, a cellular network, and/or any combination thereof. Further, the term "communicably coupled" is used herein in its broadest sense to mean any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

In some cases, the aforementioned systems and methods employ routing to handle calls and/or data. As used herein, the term "routing" is used in its broadest sense to mean any action taken to transfer, initiate, terminate, end, and/or direct calls and/or data. In various instances, calls are handled by network routing resources. As used herein, the terms "network resource," "network element," or "network routing resource" are used in their broadest senses to mean any device and/or software capable of routing a call and/or data, including, but not limited to, a session border controller, a gateway, a gateway controller, a softswitch, a proxy server, or a feature server. In some embodiments, calls are routed to or from switches, such as, for example, a host switch or a remote switch. As used herein, the term "switch" refers to a network routing resource or any other device capable of performing switching functions associated with placement and/or routing of calls. According to some embodiments, calls may be placed to or from communications devices. As used herein, the term "communications device" is used in its broadest sense to mean any device capable of initiating, transmitting, and/or receiving communications through a network, and includes, but is not limited to, a telephone, a fax machine, an Internet Protocol ("IP") phone, a SIP phone, and/or a wireless phone.

Figure 1:
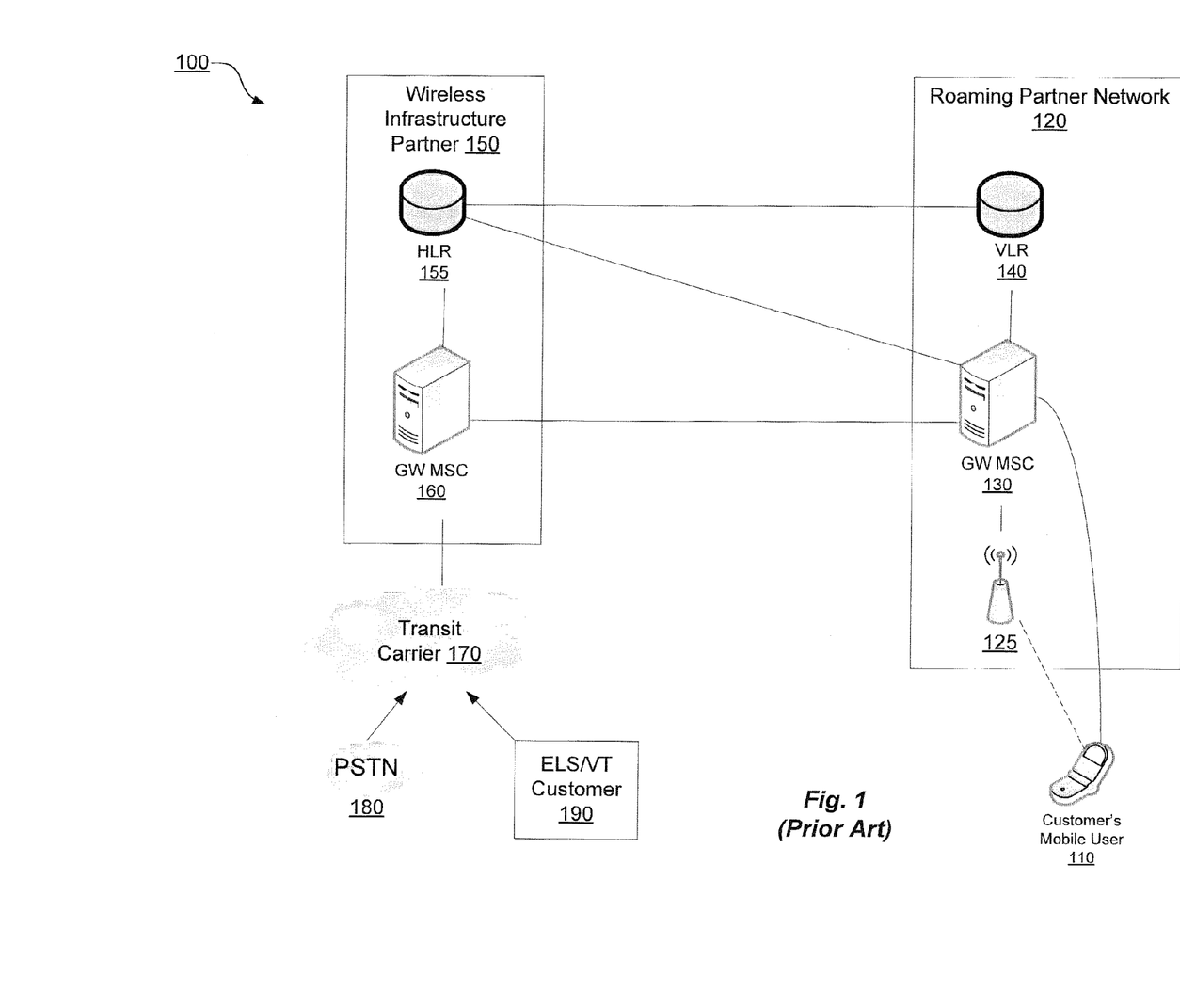
FIG. 1 is a block diagram illustrating an exemplary network implementation.

Turning to FIG. 1, an exemplary network architecture 100 performing mobile handset registration according to past techniques is depicted. Network 100 includes a mobile user handset 110 that is a subscriber to a wireless infrastructure partner 150. It is assumed that the mobile user 110 is outside of the service area of the wireless infrastructure partner 150 and is roaming within a roaming partner network 120. When powered on, the mobile user handset 110 searches for wireless networks 120 according to a list in the handset. Once a network 120 is acquired, the handset 110 sends its mobile subscriber ID (MSID) to the visiting network 120 via serving tower 125.

The wireless network 120, and specifically Gateway Mobile Switching Center (GW MSC) 130 of the roaming partner network 120, uses the MSID to locate a home network HLR 155 for the mobile user 110. The home network HLR 155 stores the visiting network VLR 140 information and sends the telephone number (TN) and feature description for the mobile user 110 to the serving VLR 140. VLR 140 stores the TN and feature description and also tracks the mobile user handset 110 as it moves between serving towers 125. Wireless infrastructure partner 150 may also have a GW MSC 160 of its own that provides connections to a transit carrier 170 and the PSTN 180, as well as to other enhanced local service and voice termination customers 190.

Implementing an MVNO into the network structure depicted in FIG. 1 can be problematic. Two particularly difficult areas for MVNOs are telephone number provisioning and voicemail services. Most MVNOs do not own a home location register (HLR) on which to provision telephone numbers for location tracking, and thereby call routing. In addition, many MVNOs would like to offer a voicemail option specific to the MVNO, rather than having to rely on the voicemail services of a third party wireless carrier. An MVNE that could provide advanced features relating to these areas would be beneficial.

Figure 2:
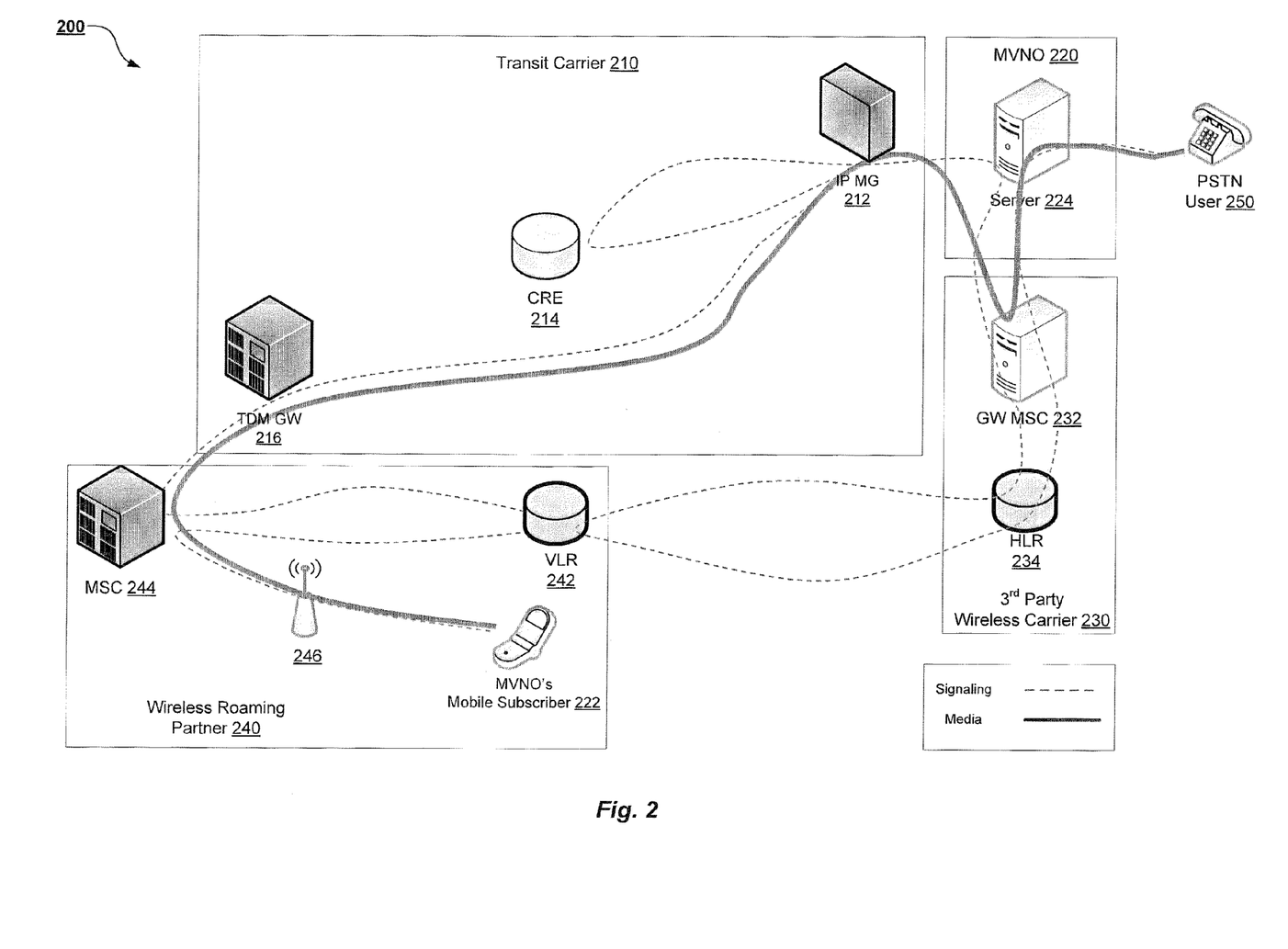
FIG. 2 illustrates a block diagram of an exemplary network configuration for provisioning MVNO telephone numbers according to embodiments of the present invention.

FIG. 2 is an exemplary network architecture 200 illustrating an MVNO that provisions a MVNO TN and the associated MSID for the TN on a third party wireless carrier's HLR, according to one embodiment of the invention. Embodiments of the invention allow the MVNO 220 to provision TNs and associated MSIDs owned by the MVNO 220 (e.g., the TN of mobile subscriber 222 and its associated MSID) on an HLR 234 of a third party wireless carrier 230. In some embodiments, the third party wireless carrier is an MVNE. The provisioning is allowed even though the third party wireless carrier 230 does not own the TN; rather, the MVNO owns the TN. In some cases, the third party wireless carrier 230 may give the MVNO a set of TNs and MSIDs to assign to customers and to eventually provision onto the HLR 234.

As shown in FIG. 2, the signal flow for a typical call is depicted by the dashed line, and a media flow for a typical call is depicted by the solid line. MVNO mobile phone 222 is registered in a network of a wireless roaming partner 240, and is being served by the roaming partner's VLR 242. The HLR 234 of the third party wireless carrier 230 (e.g., MNVE) that is serving the MVNO 220 knows of VLR 242.

In one embodiment, MVNO 220 may receive a call from the PSTN 250 destined for the MVNO mobile subscriber's 222 TN. The TN is not owned by the third party wireless carrier 230. An MVNO server 224 (e.g., a feature server) is configured to route/forward the call (including the TN information) to the GW MSC 232 of the third party wireless carrier 230. In example embodiment, the MVNO server 224 may route/forward the call via an Invite message to the GW MSC 232 with the TN in the Request Uniform Resource Indicator (URI) and the 'TO' header of the Invite message.

At this point, GW MSC 232 queries HLR 234 to determine the temporary location directory number (TLDN) assigned by the serving VLR 242 to the MVNO mobile subscriber 222. HLR 234 queries VLR 242, where the mobile subscriber 222 is currently registered, to get the TLDN. Once HLR 234 receives the TLDN from VLR 242, it returns the TLDN to GW MSC 232. GW MSC 232 then initiates a new call to a server 224 of the MVNO 220 using the acquired TLDN. In one exemplary embodiment, the new call to the server 224 uses the acquired TLDN in the Request URI, while maintaining the 'TO' header and 'FROM' header from the initial Invite. One skilled in the art will appreciate that various signaling methods may be utilized to communicate the call, such as, for example, signaling methods associated with code division multiple access (CDMA) or global system for mobile communications (GSM) schemes.

The MVNO server 224 sends the new call with the TLDN to an IP media gateway (IP MG) 212 of a transit carrier 210. In one embodiment, the MVNO server 224 sends the new call with the TLDN in the Request URI and the same 'TO' and 'FROM' headers to IP MG 212. IP MG 212 queries a core routing engine (CRE) 214 of the transit carrier 210 for routing information for the TLDN. Using the routing information from CRE 214, IP MG 212 sends the call to a time division multiplexed (TDM) GW 216 of a transit carrier 210. TDM GW 216 terminates the call directly to the wireless roaming partner MSC 244, if there is access. Otherwise, in other embodiments, the call may be routed thru the PSTN.

Using the TLDN, the MSC 244 queries the VLR 242 to determine the Original Called Number (OCN) and cell site 246 to terminate the call. In one exemplary embodiment, an Initial Address Message (IAM) from TDM GW 216 may contain the TLDN in the Called Number field and the TN (from 'TO' header of Invite) in the OCN parameter. The OCN should also be in the received IAM message.

Finally, the MSC 244 sends the call, using the OCN, to the serving cell 246 for termination. One skilled in the art will appreciate and envision that modifications to the network configuration and flow may be made while still accomplishing the same result for the MVNO.

Figure 3:
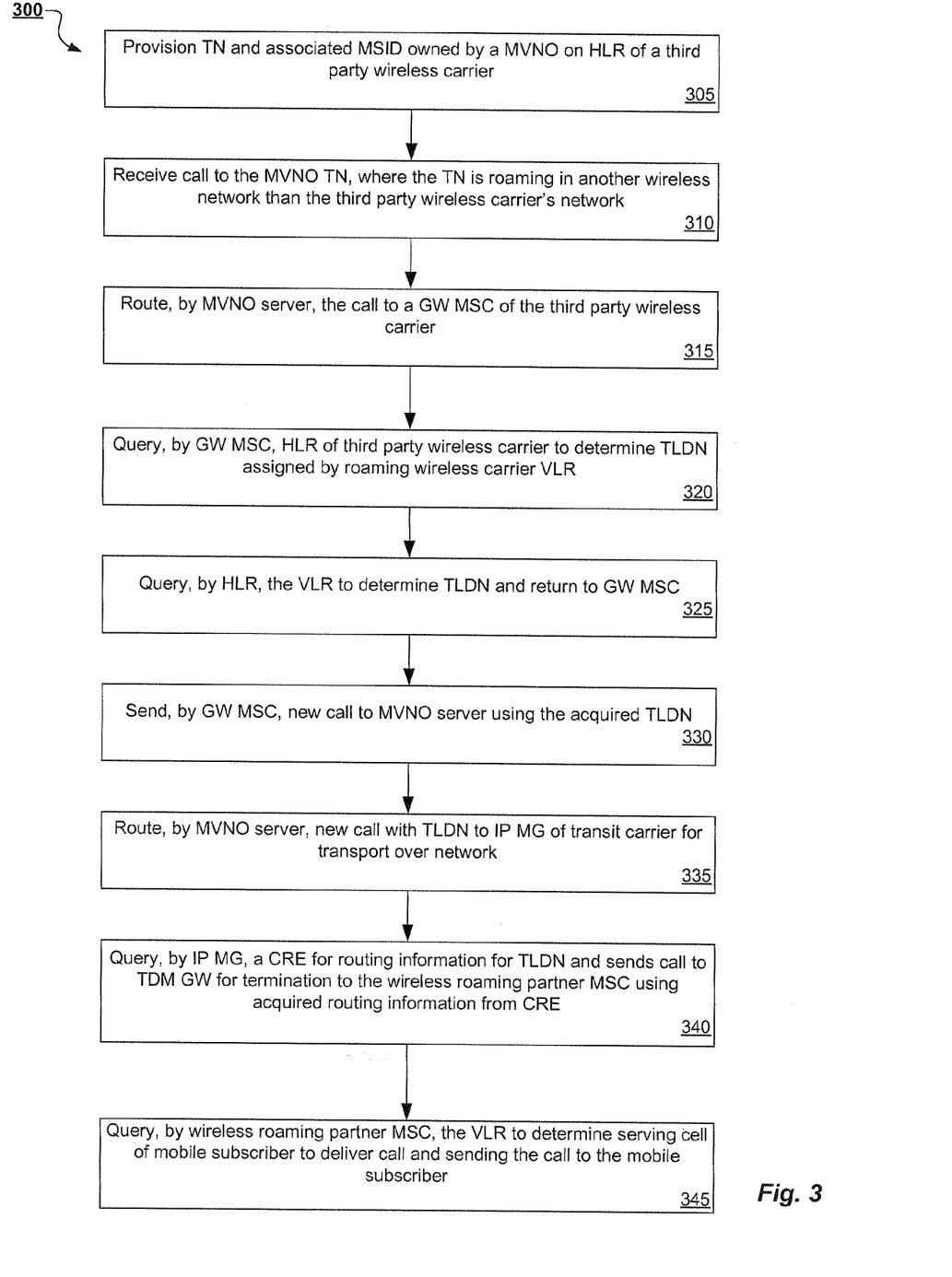
FIG. 3 depicts a flow diagram illustrating methods for provisioning MVNO telephone numbers, according to various embodiments of the present invention.

FIG. 3 is a flow diagram illustrating a method for provisioning a MVNO's telephone number and associated MSID on a third party wireless carrier's HLR according to one embodiment of the invention. As depicted, FIG. 3 corresponds to the exemplary network and associated explanation provided with respect to FIG. 2, and, more specifically, to the signal and media flows depicted by the dashed and solid lines in FIG. 2.

Process 300 begins at processing block 305 where a TN and associated MSID owned by a MVNO are provisioned in the HLR of a third party wireless carrier. Then, at processing block 310, an MVNO server receives a call to the MVNO TN, where the mobile subscriber associated with the TN is roaming in another wireless network other than the third party wireless carrier's network. At processing block 315, the MVNO server routes the call to a GW MSC of the third party wireless carrier.

At processing block 320, the GW MSC queries the HLR of the third party wireless carrier to determine the TLDN assigned by the roaming wireless carrier's VLR to the MVNO mobile subscriber. In turn, the HLR queries the VLR to determine the TLDN and return this to the GW MSC at processing block 325. The GW MSC initiates a new call using the acquired TLDN to the MVNO server at processing block 330. Then, at processing block 335, the MVNO server routes the new call (encompassing the original call) with the TLDN to an IP MG of a transit carrier for transport over a network to the wireless roaming partner network.

At processing block 340, the IP MG queries a CRE of the transit network for routing information for the TLDN. Using this routing information, the IP MG sends the call to a TDM GW for termination to the wireless roaming partner MSC. Finally, at processing block 345, the wireless roaming partner MSC queries the VLR to determine a serving cell in which the mobile subscriber is registered and delivers the call via the identified serving cell. One skilled in the art will appreciate that FIG. 3 encompasses one embodiment of a method for MVNO telephone number provisioning and that other methods may also be implemented to accomplish this result.

Figure 4:
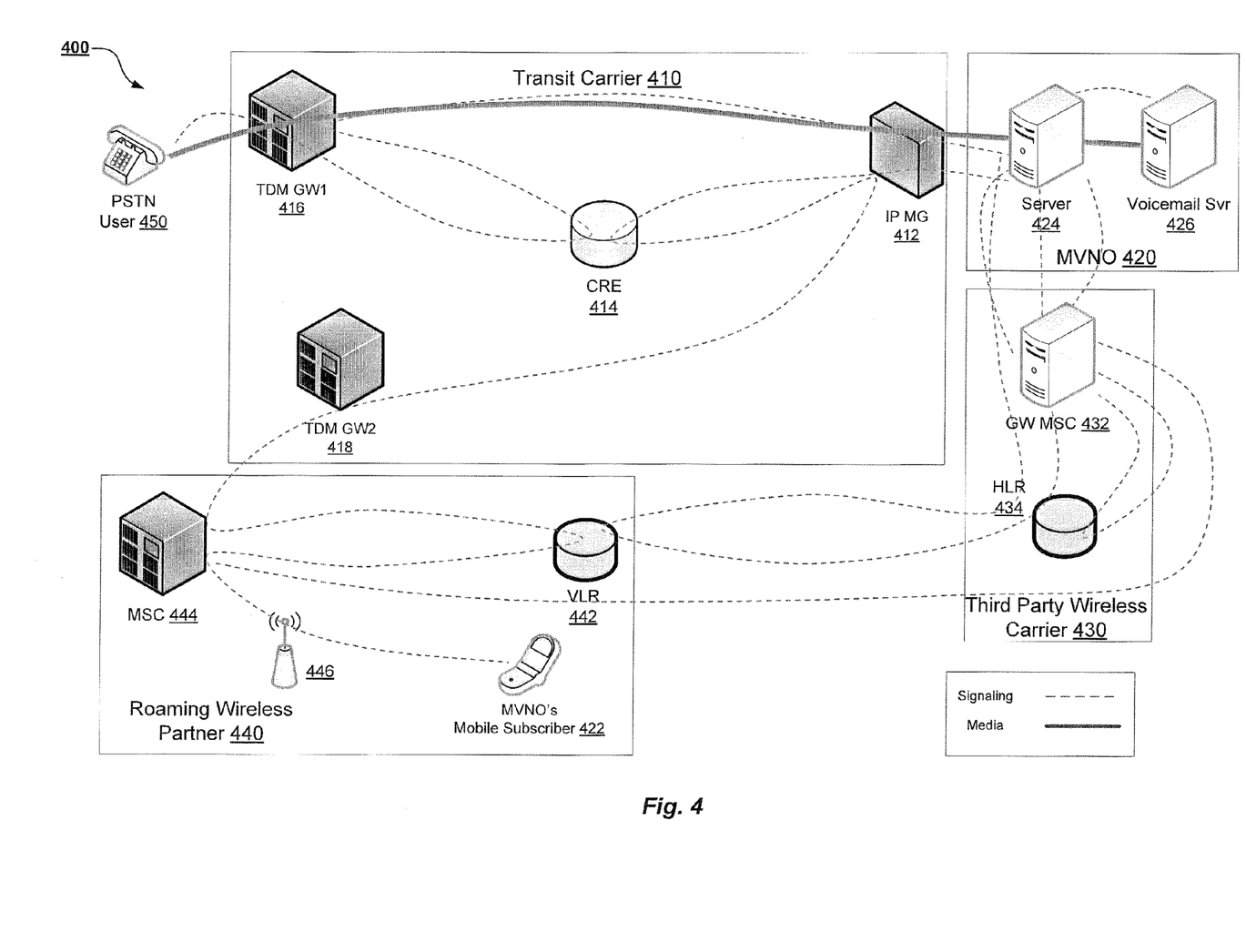
FIG. 4 illustrates a block diagram of an exemplary network configuration for an MVNO to provide voicemail services according to embodiments of the present invention.

FIG. 4 is a block diagram depicting an exemplary network architecture 400 where an MVNO provides customized voicemail services in lieu of voicemail service from a third party wireless carrier according to one embodiment of the invention. In some embodiments, TNs and MSIDs owned by the MVNO may be provisioned on a third party wireless carrier HLR as discussed with respect to FIGS. 2 and 3.

With reference to FIG. 4, the signal flow for a typical call is depicted by the dashed line, and a media flow for a typical call is depicted by the solid line. Mobile subscriber 422 is registered in the roaming wireless partner network 440 and is being served by the roaming partner VLR 442. The HLR 434 of the third party wireless carrier 430 (e.g., MVNE), where the TNs and MSIDs of the MVNO 420 are provisioned, knows of VLR 442. In embodiments of the invention, HLR 434 is not configured with a call forward/transfer number to voicemail for scenarios when there is no answer or response. Instead, the GW MSC 432 releases back to the MVNO server 424 with, for example, a pre-determined session initiation protocol (SIP) Message (e.g., SIP 480: Temporarily Unavailable or 408: Request Timeout). One skilled in the art will appreciate that other signaling protocols may be also be utilized.

In one embodiment, a transit carrier 410 receives a call for a TN owned by MVNO 420. TDM GW1 416 queries a CRE 414 of transit carrier 410 for routing information to the MVNO 420. Based on the routing information, TDM GW1 416 routes the call to IP MG 412 of transit carrier 410. IP MG 412 then sends the call to MVNO's IP trunk group (TG), for example, which is connected to MVNO server 424. MVNO server 424 determines whether the call should be terminated to the mobile subscriber 422 and then sends call to GW MSC 432 of the third party wireless carrier 430. GW MSC 432 queries the HLR 434 to determine the TLDN assigned by the serving VLR 442.

HLR 434 queries VLR 442 where the mobile subscriber 422 is currently registered to get the TLDN. HLR 434 returns the TLDN to GW MSC 432. GW MSC 432 then initiates a new call leg (encompassing the original call) to the MVNO server 424 using the acquired TLDN. In one exemplary embodiment, the acquired TLDN may be in a Request URI, while the mobile subscriber 422 TN is maintained in 'TO' header. One skilled in the art will appreciate that various signaling methods may be utilized to communicate the call, such as, for example, signaling methods associated with code division multiple access (CDMA) or global system for mobile communications (GSM) schemes.

MVNO server 424 sends the new call, with the TLDN, to IP MG 412 of transit carrier 410. In one exemplary embodiment, the MVNO server 424 may send the new call with the TLDN in the Request URI and same 'TO' and 'FROM headers from the original call. IP MG 412 queries CRE 414 for routing information associated with the TLDN. Using the acquired routing information from the CRE 414, IP MG 412 sends the call to TDM GW2 418.

TDM GW2 418 terminates the call directly to MSC 444, if there is direct access. Otherwise, in other embodiments, the call is routed thru the PSTN. In one exemplary embodiment, an IAM is used from TDM GW2 418. The IAM should contain the TLDN in the Called Number field and the mobile subscriber's 422 TN (from 'TO' header of Invite message) in the OCN parameter.

Using the TLDN, the MSC 444 queries the VLR 442 to determine the OCN and cell site 446 to terminate the call. MSC 444 then sends the call using the OCN to the serving cell 446 for termination to the mobile subscriber 422.

In embodiments of the invention, when the mobile subscriber does not answer or is unreachable, the MSC 444 times out and sends a redirect request (for example, in one embodiment, an ANSI-41 Redirect Request) including the reason for redirection to the GW MSC 432. The GW MSC 432 receives the redirect request and launches a transfer to/forward number request (for example, in one embodiment, an ANSI-41 Transfer To Number Request) to the HLR 434 to determine the mobile subscriber's 422 transfer number for CFNA/CFNR reasons. In some embodiments, other messages and formats are envisioned to convey the same information.

In embodiments of the invention, no transfer to/forward number is provisioned in the HLR 434. As a result, the GW MSC 432 sends an unavailable or timeout message (for example, in one embodiment, SIP 480: Temporarily Unavailable (for no response) or SIP 408: Request Timeout (for no answer)) to the initial call leg received from the MVNO server 424. The GW MSC 432 then initiates a teardown of the entire TLDN leg of the call by sending a cancel message to the initial call leg it sent. Upon receipt of the unavailable or timeout messages from the GW MSC 432, in response to the initial call leg, MVNO server 424 initiates a new termination leg to the MVNO Voicemail server 426 using the call information from the initial call leg. In one exemplary embodiment, a confirmation message (e.g., '200 OK') from the Voicemail server 426 will provide new session description protocol (SDP) information to IP MG 412 for the initial call leg.

Figure 5A:
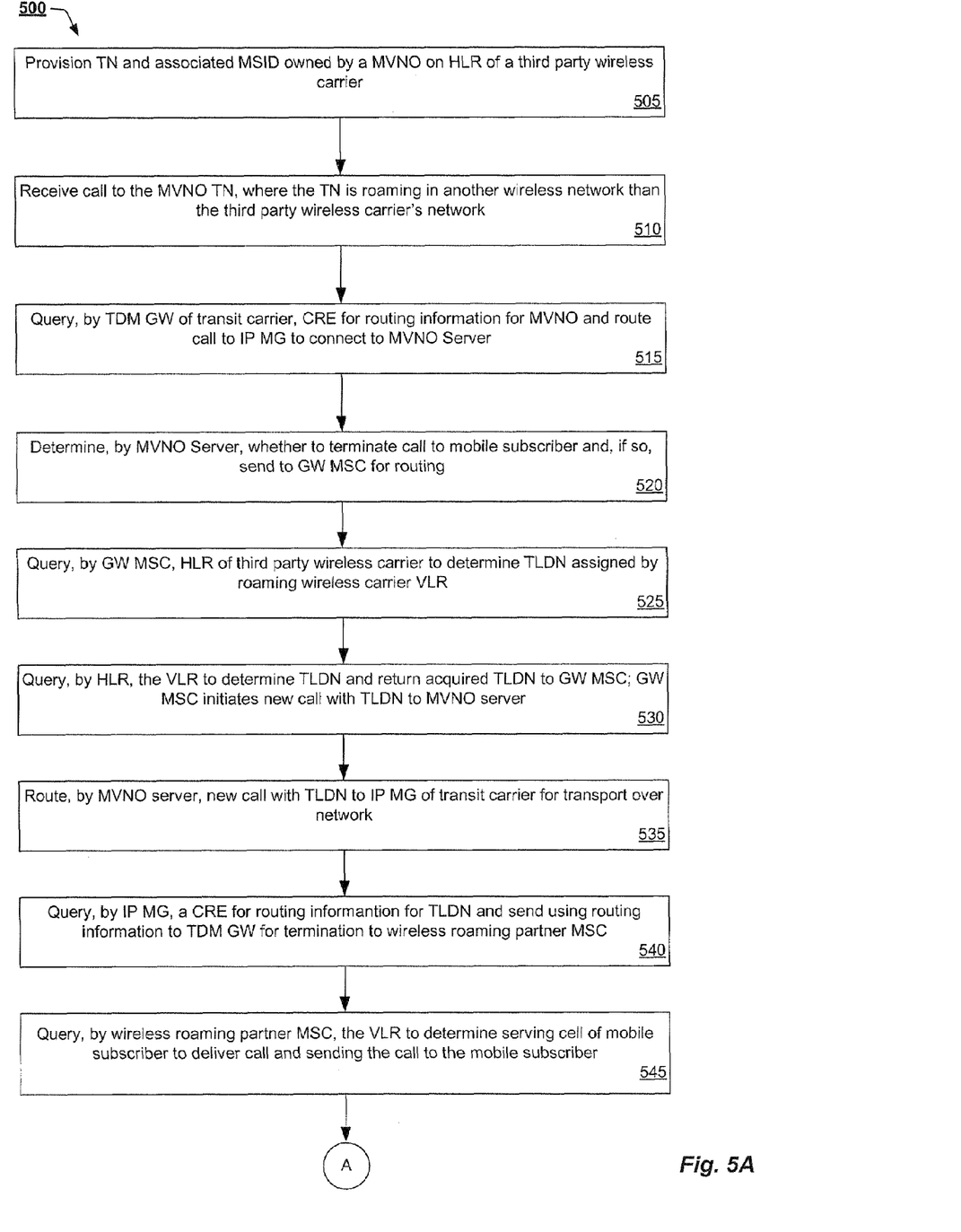
FIG. 5A depicts a flow diagram illustrating methods for an MVNO to provide voicemail services, according to various embodiments of the present invention.
Figure 5B:
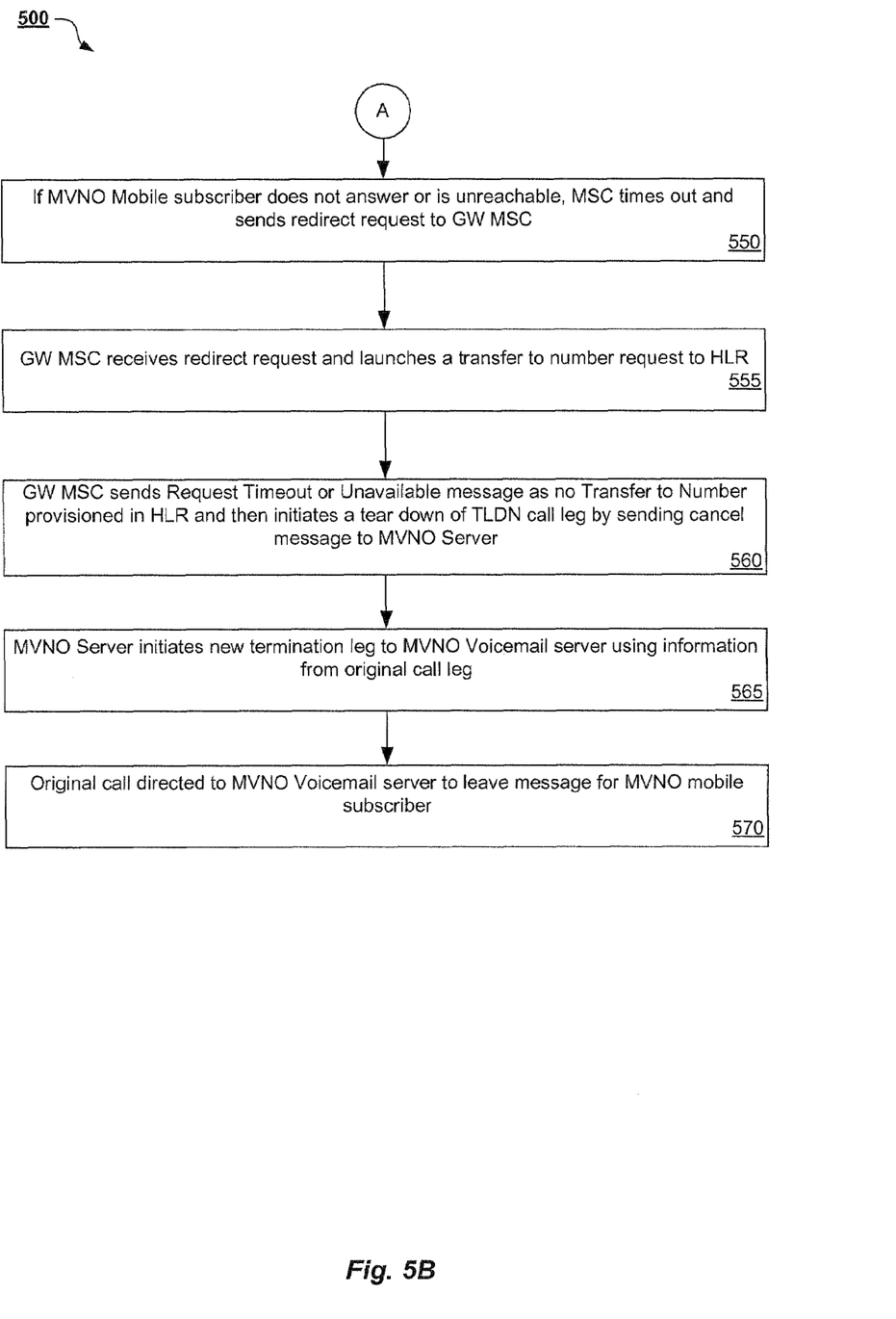
FIG. 5B depicts a flow diagram illustrating methods for an MVNO to provide voicemail services, according to various embodiments of the present invention.

FIGS. 5A and 5B are flow diagrams illustrating a method for provisioning a MVNO's telephone number and associated MSID on a third party wireless carrier's HLR, according to one embodiment of the invention. As depicted, FIGS. 5A and 5B correspond to the exemplary network and associated signal and media flows described with respect to FIG. 4.

Process 500 begins at processing block 505 where a TN and associated MSID owned by a MVNO are provisioned in the HLR of a third party wireless carrier (e.g., MVNE). Then, at processing block 510, an MVNO server receives a call to the MVNO TN. The TN is roaming in a wireless network other than the third party wireless carrier's network.

At processing block 515, a TDM GW of a transit carrier queries a CRE for routing information to the MVNO, and then routes the call to an IP MG of the transit carrier to deliver to an MVNO server. Then, at processing block 520, the MVNO server determines whether to terminate the call to the MVNO mobile subscriber and, if so, sends the call to the GW MSC of the third party wireless carrier for routing. The GW MSC queries the HLR of the third party wireless carrier to determine a TLDN assigned by the roaming wireless carrier VLR to the mobile subscriber at processing block 525.

At processing block 530, the HLR queries the VLR to determine the TLDN and returns the acquired TLDN to the GW MSC. The GW MSC then initiates a new call with the acquired TLDN to the MVNO server. At processing block 535, the MVNO server routes the call with the TLDN to the IP MG of the transit carrier for transport. Then, at processing block 540, the IP MG queries the CRE for routing information associated with the TLDN and sends the call (using the routing information) to a TDM GW for termination to the roaming wireless partner MSC. The roaming wireless partner MSC queries the VLR to determine a serving cell of the mobile subscriber to deliver the call and then sends the call to the mobile subscriber via the serving cell at processing block 545.

At processing block 550, if the mobile subscriber does not answer or is unreachable, the MSC times out and sends a redirect request to the GW MSC of the third party wireless carrier. The GW MSC receives the redirect request and launches a transfer to number request to the HLR at processing block 555. Then, at processing block 560, the GW MSC sends a request timeout or unavailable message as no transfer to number is provisioned in the HLR. In addition, the GW MSC initiates a tear down of the TLDN call leg by sending a cancel message to the MVNO server. At processing block 565, the MVNO server initiates a new termination leg to the MVNO voicemail server using information from the original call leg. Finally, at processing block 570, the original call is directed (via the new termination leg) to the MVNO voicemail server in order for the calling party to leave a message for the MVNO mobile subscriber.

FIG. 6 is an example of a computer system 600 with which embodiments of the present invention may be utilized. Computer system 600 may represent any of the components depicted in FIGS. 1, 2, and 4, which may implement one or more of the methods discussed herein for MVNO telephone number provision and voicemail routing enabled by an MVNE. In this simplified example, the computer system 600 comprises a bus 601 or other communication means for communicating data and control information, and one or more processing devices 602, such as a well known processor, Application Specific Integrated Circuit (ASIC), a field programmable gate array (FPGA), or the like, coupled with bus 601.

In this simplified embodiment, computer system 600 further comprises a random access memory (RAM) or other dynamic storage device (referred to as main memory 604), coupled to bus 601 for storing information and instructions to be executed by processing device 602. Main memory 604 also may be used for storing temporary variables or other intermediate information during execution of instructions by processor(s) 602.

Computer system 600 can also include a read only memory (ROM) 606 and/or other static storage device coupled to bus 601 for storing static information and instructions for processing device 602. A mass storage device 607, such as a magnetic disk or optical disc and its corresponding drive, may also be coupled to bus 601 for storing instructions and information, such as configuration files, a key store and registration database, etc. Such ROM 606 may comprise, for example, one or more databases in which information may be stored and/or retrieved, such as, for example, information received or sent via network architectures 100, 200, or 400.

One or more communication ports 603 may also be coupled to bus 601 for supporting network connections and communication of information to/from the computer system 600 by way of a communication network, such as a Local Area Network (LAN), Wide Area Network (WAN), or the Internet, for example. The communication ports 603 may include various combinations of well-known interfaces, such as one or more modems to provide network access, one or more 10/100 Ethernet ports, one or more Gigabit Ethernet ports (fiber and/or copper), or other well-known network interfaces commonly used in internetwork environments. In any event, in this manner, the computer system 600 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 601 to support direct operator interaction with computer system 600. Other operator and administrative interfaces can be provided through network connections connected through communication ports 603.

Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 601 via corresponding drives, ports or slots.

Embodiments of the invention have now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method comprising:
    provisioning a telephone number (TN) and its associated mobile subscriber identification (MSID) owned by a mobile virtual network operator (MVNO) on a home location register (HLR) of a third party carrier, wherein the third party carrier is not the owner of the TN;
    routing a call to the provisioned TN from a calling party by utilizing the HLR, wherein a called party of the TN is at least one of providing no answer or unreachable;
    receiving an indication from a gateway mobile switching center (GW MSC) of the third party carrier that there is no voicemail transfer number associated with the TN; and
    initiating a new call to a voicemail server of the MVNO, wherein the new call provides voicemail associated with the TN to the calling party.

2. The method of claim 1, wherein the GW MSC receives a redirect request that indicates at least one of that there is no answer by the called party at the TN or the called party at the TN is unreachable.

3. The method of claim 2, wherein, in response to the redirect request, the GW MSC launches an ANSI-41 Transfer-To-Number Request.

4. The method of claim 1, wherein there is no transfer to number provisioned for the TN in the HLR.

5. The method of claim 1, wherein the indication of no voicemail transfer-to-number is used by the GW MSC to send at least one of a timeout response or an unavailable response to the GW MSC.

6. The method of claim 5, wherein the timeout message is a SIP 408: Request Timeout message and the unavailable message is a SIP 480: Temporarily Unavailable message.

7. The method of claim 5, wherein, in response to the at least one of the timeout message or the unavailable message, the GW MSC tears down the routed call by sending a cancel message to MVNO server.

8. The method of claim 1, wherein the called party of the provisioned TN is roaming in another wireless partner's network.

9. An apparatus, comprising:
    a feature server operated by a mobile virtual network operator (MVNO) to:
        receive a call from a calling party to a telephone number (TN) owned by the MVNO, wherein the TN is provisioned with its associated mobile subscriber identification (MSID) on a home location register (HLR) of a third party carrier, wherein the third party carrier is not the owner of the TN; and
        receiving an indication from a gateway mobile switching center (GW MSC) of the third party carrier that the called party of the TN is at least one of providing no answer or unreachable and that there is no voicemail transfer number associated with the TN; and
    a voicemail server operated by the MVNO to receive a new call initiated by the feature server and to provide voicemail associated with the TN to the calling party.

10. The apparatus of claim 9, wherein the GW MSC receives a redirect request from a roaming wireless partner where the called party is registered, wherein the redirect request indicates at least one of that there is no answer by the called party at the TN or the called party at the TN is unreachable.

11. The apparatus of claim 10, wherein in response to the redirect request, the GW MSC launches an ANSI-41 Transfer-To-Number Request.

12. The apparatus of claim 9, wherein there is no transfer to number provisioned for the TN in the HLR.

13. The apparatus of claim 9, wherein the indication of no voicemail transfer-to-number is used by the GW MSC to send at least one of a timeout response or an unavailable response to the GW MSC.

14. The apparatus of claim 13, wherein the timeout message is a SIP 408: Request Timeout message and the unavailable message is a SIP 480: Temporarily Unavailable message.

15. The apparatus of claim 13, wherein, in response to the at least one of the timeout message or the unavailable message, the GW MSC tears down the routed call by sending a cancel message to MVNO server.

16. A system, comprising:
    a home location register (HLR) of a wireless carrier provisioned with a telephone number (TN) and its associated mobile subscriber identification (MSID) owned by a mobile virtual network operator (MVNO), wherein the wireless carrier is not the owner of the TN; and
    a gateway mobile switching center (GW MSC) operated by the wireless carrier to:
        route a call to the provisioned TN from a calling party by utilizing the HLR, wherein the called party of the TN is at least one of providing no answer or unreachable; and
        provide an indication to the MVNO that there is no voicemail transfer number in the HLR associated with the TN in order for the MVNO to initiate a new call to a voicemail server of the MVNO, wherein the new call provides voicemail associated with the TN to the calling party.

17. The system of claim 16, wherein the GW MSC receives a redirect request from a roaming wireless partner where the mobile subscriber is registered, the redirect request that indicates at least one of that there is no answer by the called party at the TN or the called party at the TN is unreachable.

18. The system of claim16, wherein the indication of no voicemail transfer-to-number is used by the GW MSC to send at least one of a timeout response or an unavailable response to the GW MSC.

19. The system of claim 18, wherein the timeout message is a SIP 408: Request Timeout message and the unavailable message is a SIP 480: Temporarily Unavailable message.

20. The system of claim 18, wherein in response to the at least one of the timeout message or the unavailable message, the GW MSC tears down the routed call by sending a cancel message to the MVNO.

* * * * *